L. A. GARCHEY.
PNEUMATIC TIRE FOR VEHICLE WHEELS.
APPLICATION FILED JUNE 29, 1910.
1,026,858.
Patented May 21, 1912.
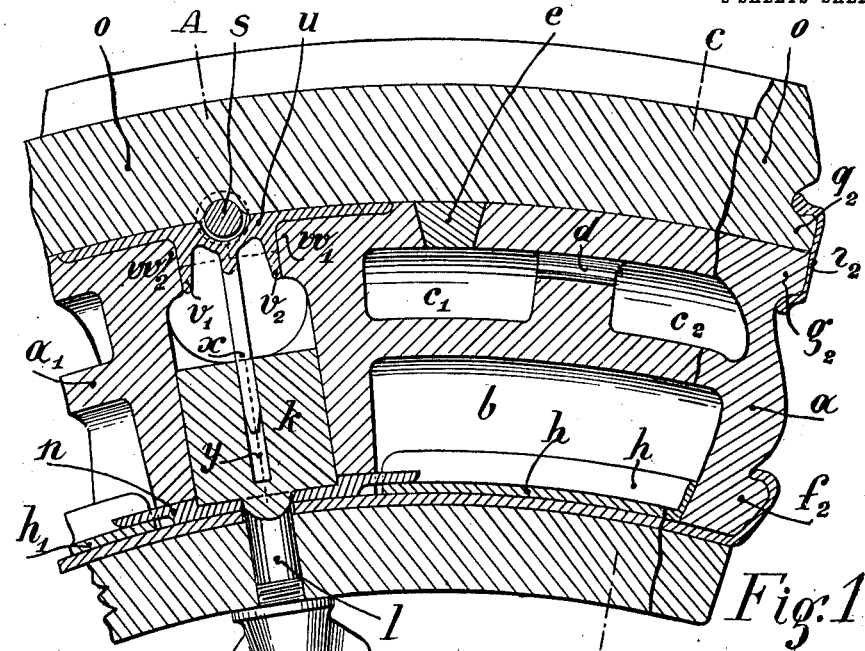
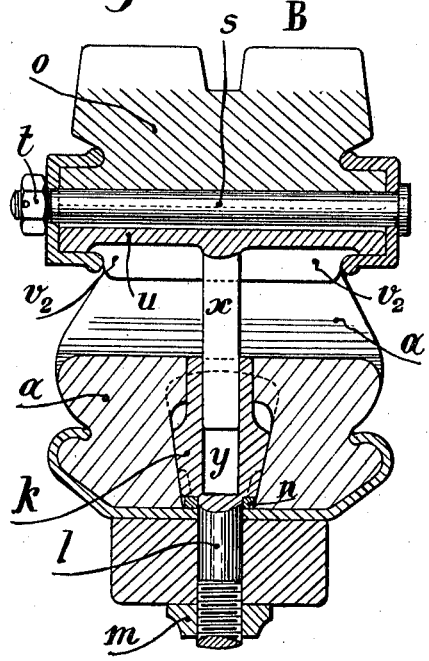
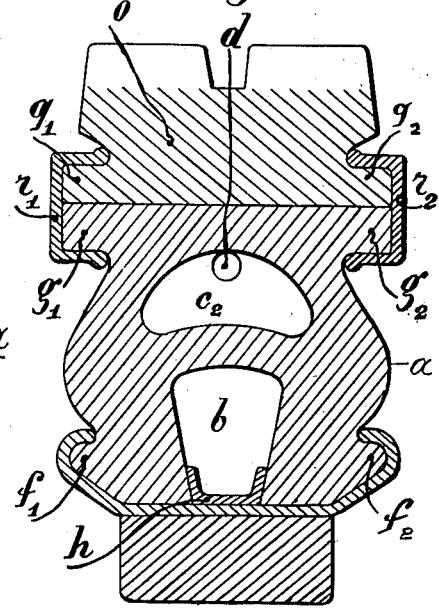

L. A. GARCHEY.
PNEUMATIC TIRE FOR VEHICLE WHEELS.
APPLICATION FILED JUNE 29, 1910.

1,026,858.

Patented May 21, 1912.
2 SHEETS—SHEET 2.

Witnesses.

Inventor.

UNITED STATES PATENT OFFICE.

LOUIS ANTOINE GARCHEY, OF PARIS, FRANCE.

PNEUMATIC TIRE FOR VEHICLE-WHEELS.

1,026,858.  Specification of Letters Patent.  Patented May 21, 1912.

Application filed June 29, 1910. Serial No. 569,601.

*To all whom it may concern:*

Be it known that I, LOUIS ANTOINE GARCHEY, a citizen of the French Republic, and resident of Paris, France, have invented certain new and useful Improvements in Pneumatic Tires for Vehicle-Wheels, of which the following is a specification.

One of the greatest inconveniences connected with pneumatic tires, that is to say with tires which comprise one or more air chambers completely closed and surrounding the wheel rim on its entire periphery, consists in the fact that said air chambers are liable to become heated during the running of the wheel. The reason therefore is that the air inclosed in said air chambers is suddenly compressed said compressions not being compensated by sufficiently quick expansion.

The present invention has for its object to obviate this grave inconvenience. With this object in view the wheel tire is composed of a certain number of independent segments each of which contains preferably two air chambers of equal volume communicating the one with the other by a channel or passage. Said air-chambers are situated in alinement so that they come successively in contact with the road. If one of said chambers comes in contact with the road the fluid which it contains is forced out of said chamber and flows through the passage into the following chamber where it is compressed. The passage of the fluid through said channel absorbs a certain amount of energy whereby the brusqueness of the compression is reduced and the increase of temperature diminished. As soon as said air-chamber gets off the ground it resumes its original volume; there is consequently a certain sucking effect exerted in said chamber while simultaneously the other air-chamber is compressed. It therefore follows that the liquid contained in said chambers is alternatingly compressed in one chamber—whereupon it expands brusquely to resume its normal volume. During the expansion all the heat produced by the compression is integrally absorbed so that no elevation of temperature takes place. The said communicating chambers may be filled with air or with air and water mixed, the water serving to better equalize the temperature and for preserving the india-rubber.

In the accompanying drawings the improved air-tire is shown.

Figure 4:
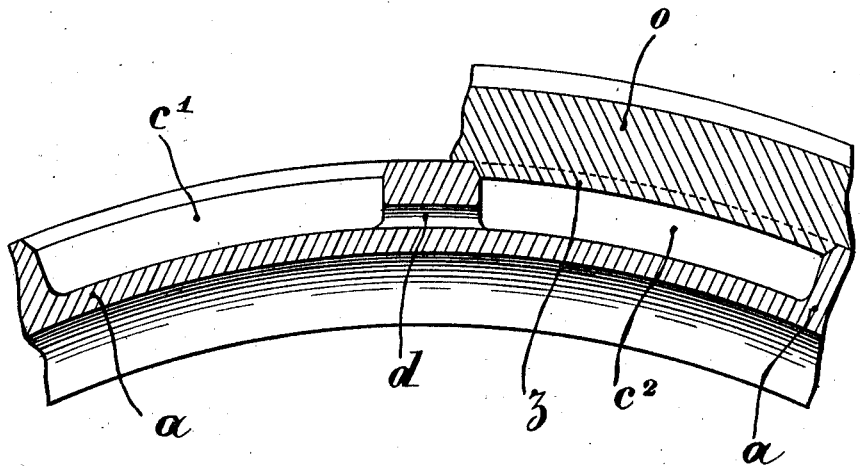
Figure 5:
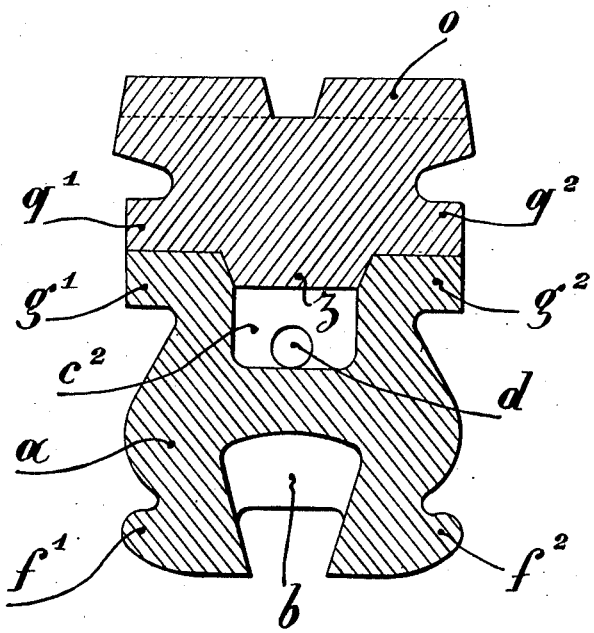

Figure 1 is a vertical section through the improved tire taken along a plane passing through the middle-line; Figs. 2 and 3 are cross sections on lines A B and C D of Fig. 1; Figs. 4 and 5 show modifications.

The improved pneumatic tire for vehicle wheels essentially consists of india-rubber blocks $a$ forming independent segmental elements. A cavity $b$ is provided in the bottom end of said elements. Above said cavity $b$ chambers $c^1$, $c^2$, etc., are arranged which communicate by means of channels $d$. One of said chambers, $c^1$ for example has an inlet opening closed by a stopper $e$. These chambers are partly filled with the fluid.

Each element $a$ has two shoulders $f^1$, $f^2$ which penetrate into the felly which can be constructed in the usual manner. The top part of the elements $a$ is flat and it forms two lateral shoulders $g^1$, $g^2$. U-irons $h$ are inserted in the cavity $b$ and they are destined to push the shoulders $f^1$, $f^2$ into the felly. The U-irons are maintained in position in any suitable manner. Two adjacent elements $a$ bear the one against the other with shoulders having each a cavity for the reception of a metal piece $k$. Said metal piece has a shaft $l$ which traverses the felly. Upon the inner threaded end of said shaft $l$ a thumb nut $m$ is screwed destined to pull the piece $k$ so that it bears upon a plate $n$ which has lateral arms extending over the ends of the U-irons $h$, $h^1$ of two adjacent elements. Said elements $a$ are maintained on the felly by means of an annular tread $o$ which has lateral flat shoulders $q^1$, $q^2$ corresponding to the shoulders $g^1$, $g^2$ of the elements. The shoulders $q^1$, $g^1$ and $q^2$, $g^2$ are connected the one with the other by means of iron bands $r^1$, $r^2$ of U-shaped cross section. The two iron bands $r^1$, $r^2$ are connected the one with the other by cross bolts $s$ and nuts $t$. Said cross bolts are located in holes of the rings and in a channel of the block $a$ and the corresponding part of the tread. At the joints of two successive segments or blocks $a$ metal plates $u$ are located which have downwardly projecting arms $v^1$, $v^2$ serving to hold apart the said iron bands $r^1$, $r^2$ and further serving as abutments for the upper shoulders $w^1$, $w^2$ of two adjacent elements. A blade $x$ downwardly projecting from the middle of the lower surface of said metal plate $u$ penetrates into a slot $y$ of the metal piece $k$. This blade serves for properly guiding the pneumatic tire upon the felly and to prevent lateral deviation of said tire.

When the wheel is running on the ground each of the elements $a$ comes in contact with the road in succession. The chambers $c^1$, $c^2$, etc., therefore are compressed the one after the other so that the fluid contained in the same flows over into the adjacent chamber through the channels $d$. As soon as an element has left off the road, it resumes its normal volume and when it arrives above the axle of the wheel, its chambers return to their normal position under the action of the iron bands $r^1$, $r^2$ which connect all the elements. It therefore follows that after having been compressed the air expands and absorbs all the heat which has been developed during the compression. The expansion being even greater than it normally ought to be a certain refrigeration of the fluid is obtained, so that the fluid circulates from one chamber to the other equalizes the temperature of all points of the element. The fluid can consist not only of air or air and water mixed, but of any other convenient liquid such as glycerin, castor oil, ammoniac, etc. The elasticity of the tire is regulated by varying the amount of liquid contained in said chambers so that the same elements can be used for vehicles of different weight.

Figs. 4 and 5 show a modification according to which the chambers $c^1$, $c^2$, etc., of the blocks or elements are open at the upper end; this arrangement greatly facilitates the manufacturing of the blocks. The chambers are closed by means of conical stoppers $z$ made in one piece with the tread $o$, the upper ends of the side walls of said chambers being beveled.

Instead of composing the tire of separate elements or blocks they could all be combined in one ring, all the chambers communicating the one with the others or separate groups of chambers being arranged. The chambers can further be filled with air only without admixture of any liquid.

I claim:—

1. An improved pneumatic tire for vehicle wheels, comprising in combination a certain number of identical independent blocks of india-rubber having a large cavity in the lower end and pneumatic chambers in the upper part, a channel connecting two adjacent chambers, means for fixing said blocks on the felly and a tread covering all the blocks, substantially as described and shown and for the purpose set forth.

2. An improved pneumatic tire for vehicle wheels, comprising in combination a certain number of identical independent blocks of india-rubber having a large cavity in the lower end, closed chambers in the upper part of said blocks, said chambers being filled partly with a mixture of air and of a suitable liquid which is inoffensive for the india-rubber, a channel connecting two adjacent chambers, a tread covering all said blocks and means for fixing the blocks in the felly, substantially as described and shown and for the purpose set forth.

3. An improved pneumatic tire for vehicle wheels, comprising in combination a certain number of identical independent blocks of india-rubber having a large cavity in the lower end, chambers in the upper end which are open at their upper ends and filled with an elastic fluid, a channel connecting two adjacent chambers, a tread covering all said blocks and conical stoppers made in one piece with the said tread and projecting from the lower surface of the same to close the said chambers, and means for fixing the blocks on the felly, substantially as described and shown and for the purpose set forth.

In witness whereof I have hereunto set my hand in the presence of two witnesses.

LOUIS ANTOINE GARCHEY.

Witnesses:
ALFRED FREY,
H. C. COXE.

---

Copies of this patent may be obtained for five cents each, by addressing the "Commissioner of Patents, Washington, D. C."